Oct. 28, 1958
G. N. TSIGULOFF
2,857,850
IN-LINE MOTOR PUMP
Filed Feb. 17, 1956
2 Sheets-Sheet 1
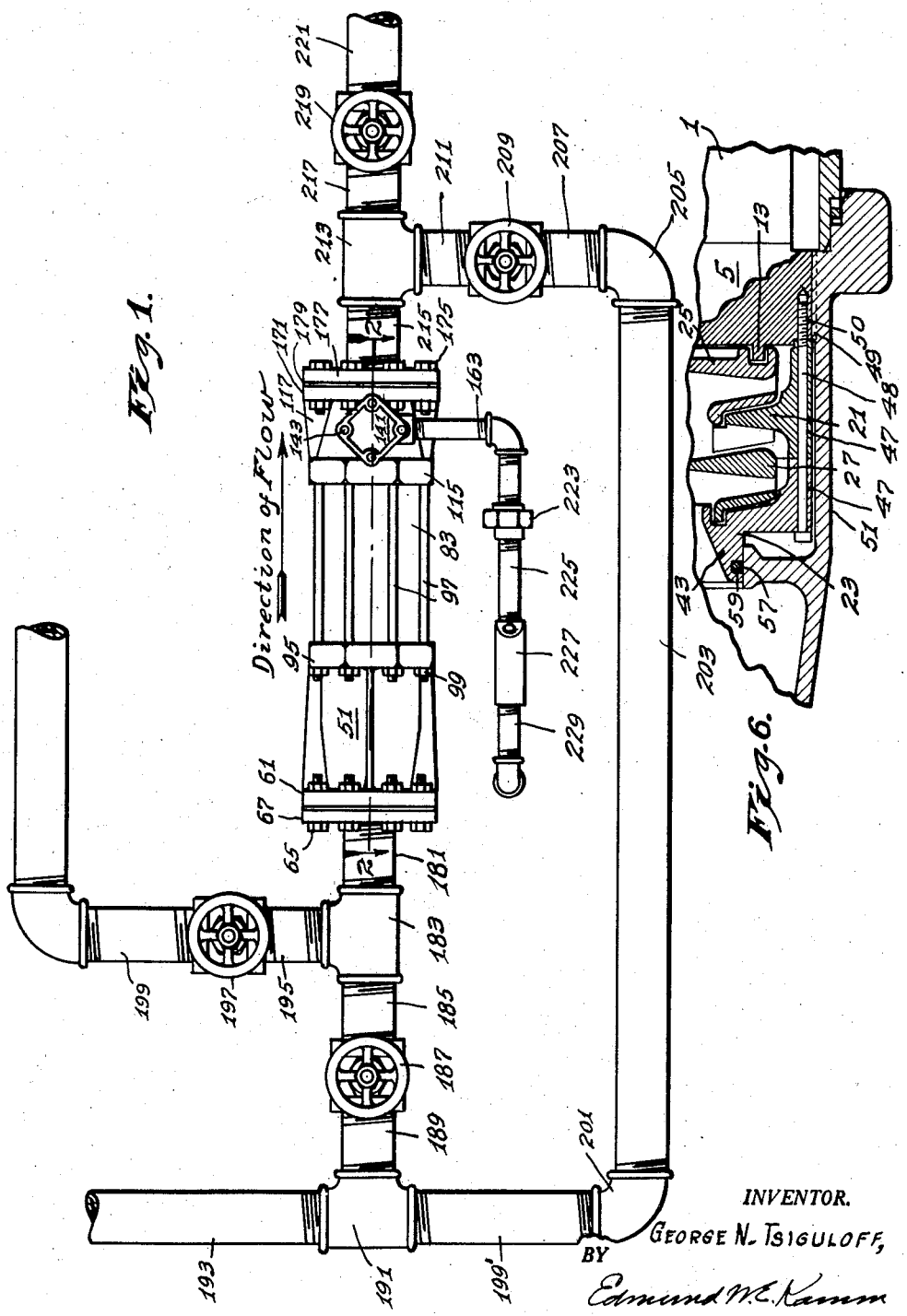
INVENTOR.
GEORGE N. TSIGULOFF,
BY
Edmund W. C. Kamm
ATTORNEY.

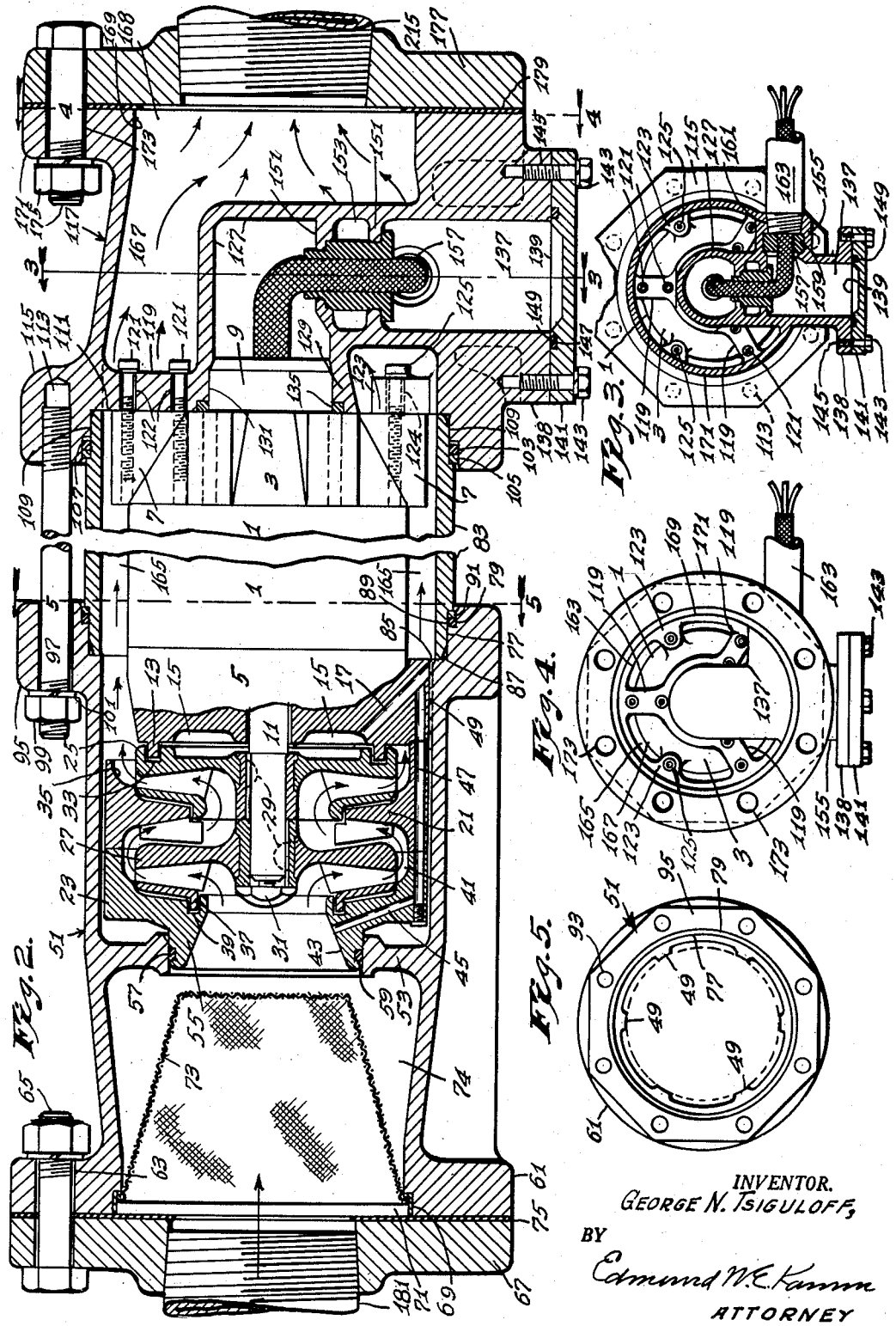

United States Patent Office 2,857,850
Patented Oct. 28, 1958

2,857,850

IN-LINE MOTOR PUMP

George N. Tsiguloff, Fort Wayne, Ind., assignor to Tokheim Corporation, Fort Wayne, Ind., a corporation of Indiana Application February 17, 1956, Serial No. 566,118

14 Claims. (Cl. 103—87)

This invention relates to an in-line motor pump. More specifically, it relates to an electric motor and a pump which is connected to be directly driven by the motor, which are incorporated directly and bodily within the pipe line through which they are causing liquid to flow.

The usual pumping installation includes a concrete base on which is mounted a motor and pump, usually mounted on a metal base. The suction and discharge lines must be brought to the corresponding connections of the pump. Also it is often necessary to provide a housing or other cover for such sets to protect them from the weather. Such installations are expensive especially since piping must often be run out of an otherwise direct path to reach the pump. Limitations are often encountered in finding a suitable location for the motor-pump installation. Further, pit installation of such motor-pump sets is not generally feasible because of the bulk of the set and because it would usually suffer damage from water entering the pit.

It is an object of the invention to provide a motor-pump unit which is an integral, totally enclosed unit which requires no special bases or mounting, which is installed directly in and is supported by the pipe line and which may be disposed underground, in a pit under a floor or ceiling or otherwise in the same manner as the pipeline itself. The unit is totally enclosed, weather, water and vapor proof so that it requires no additional protective structures.

Another object of the invention is to provide a motor pump which can be readily inserted in and removed from a pipe line by merely separating the electrical connections, breaking an electric conduit union and removing the bolts from two standard pipe flanges.

It is a further object of the invention to provide a motor-pump unit which can be removed as a unit and readily replaced by a spare unit so that the down time of the system will be minimized.

Yet another object of the invention is to provide a motor pump unit, a number of which can be installed at intervals directly in a long pipe line to boost the flow.

It is still another object of the invention to provide a motor-pump unit which may be installed in any position so that it may be installed in any desired run of pipe regardless of the direction of flow.

A further object of the invention is to provide a motor-pump unit which is of small size relative to its capacity.

Another object of the invention is to provide a motor-pump unit which is capable of pumping various types of liquids.

Yet another object of the invention is to provide a motor pump unit which can be connected directly in overhead piping thus eliminating the necessity for bringing the piping to floor level to make connections with the pump as is the case with conventional types of motor pump sets.

These and other objects will become apparent from a study of this specification and the drawings which are attached hereto, made a part hereof and in which Figure 1 is a plan view of the motor-pump unit incorporated in a pumping system.

Figure 2 is a sectional view taken substantially on the line 2—2 of Figure 1 showing the motor-pump unit.

Figure 3 is a sectional view taken substantially on line 3—3 of Figure 2 showing the conduit junction box and the pump structure.

Figure 4 is a sectional view taken substantially on line 4—4 of Figure 2 showing the discharge body.

Figure 5 is a sectional view taken substantially on line 5—5 of Figure 2 showing the pump housing.

Figure 6 is a sectional view similar to Figure 2 showing the means for holding the pump casing on the motor.

MOTOR PUMP UNIT

Referring first to Figure 2, the numeral 1 represents an electric motor which has a length which is several times its diameter. This elongated unit is well adapted for incorporation in a pipe or tube. The motor may be of any reasonable horsepower and voltage specifications. The installation shown in Figure 1 preferably uses a 230 volt 60 cycle 3.5 horsepower motor, either single or 3 phase.

The motor is provided with end bells 3 and 5. The bell 3 is provided with three, equally spaced, radially extending fins 7 and with a central boss 9 through which the electric wires pass out from the motor.

The bell 5 passes the rotary motor shaft 11 and is provided with an axially extending annular sealing flange 13. It is also provided with a recess 15 which communicates with a channel 17 which will be described later.

Fixed to the bell 5 by means of a number of screws 48 which enter several of the channels 47 described below, (see Fig. 6) is a diffuser ring 21 of the pump and the pump cover 23. The ring and cover form a pump body. Mounted on the motor shaft 11 are the impellers 25 and 27 which are drivingly connected to the shaft by keys 29 and held in place by a screw 31. The impellers constitute the rotary member or rotor of the pump. The impeller 25 has a groove 33 to receive the flange 13 to restrict the flow of high pressure fluid from the discharge passages to the recess 15.

The impeller 27 has an axial flange 37 which enters a groove 39 in the cover 23 to restrict flow from the outlet chamber 41 of the first stage back to the suction port 43.

The pump cover has a channel 45 which communicates with an axial channel 47 which in turn communicates with the channel 17. Thus, pressure fluid which does enter the recess 15 is relieved to the suction chamber 43 through the channels 17, 45 and 47. The open end of channel 17 is blocked off by one of a number of circumferentially spaced ribs 49 which are formed on the housing 51. The ribs also serve to center and support the end bell radially when the pump lies horizontally. The housing is also provided with an inwardly directed flange 53 which receives the axial flange 55 formed on the pump cover. An O-ring seal 57 is mounted in a groove 59 in the flange.

A flange 61 is formed on the inlet end of the housing which is provided with holes 63 adapted to receive bolts 65 for holding the companion flange 67 in place. The inlet opening of flange 61 is counterbored at 69 to receive the top ring 71 of the screen basket 73 which extends into the inlet or suction chamber 74. A gasket 75 is provided between the flanges to seal the joint.

A bore 77 is formed in the other end of the housing 51 and is provided with a counterbore 79 which has a bevelled edge. A sleeve 83 has one end inserted in the bore and rests upon the shoulder 85. The end of the sleeve 83 is preferably bevelled at 87 to facilitate assembly and is preferably reduced in diameter to form a shoulder. A ring 91 of square cross-section rests against the shoulder and holds an O-ring seal 89 in the counterbore to seal the joint.

The housing is provided with an external, radially extending flange 95, adjacent the bore 77, which flange is axially perforated at 93 to receive the tie rods 97 which are held in place by nuts 99 resting on washers 101.

The opposite end of the sleeve is similarly mounted by means of O-ring 103 and ring 105 in the bore 109 and counterbore 107 and rests on the flange 111. The tie rods are screwed in tapped holes 113 in the radial flange 115 which is formed integrally on the discharge body 117.

As will be seen from Figures 2 and 3 this body has a number of radial spokes 119 which rest upon the fins 7 of the motor and screws 121 pass through holes 122 in the spokes and enter tapped holes in the fins so that the motor 1 is held against axial displacement.

Additional lugs 123 are formed on the body, project inwardly and are perforated at 124 to receive screws 125 which also enter tapped bosses (not shown) on the motor to provide additional support for the motor.

The body is provided with walls 127 which define an axially extending hollow boss 129 which is provided with a bore 131 adapted to receive boss 9 on the motor and with a counterbore which receives the O-ring gasket 135 which is compressed when the screws 121 and 125 are tightened. This gasket prevents liquid from entering the electric wire conduit defined by the walls 127. It should be noted that the spokes 119 are integral with the boss 129 so as to support it radially.

The passage 137, which is defined by walls 127 which turn substantially ninety degrees, terminates in a flange 138 having an opening 139, at the side of the body and the opening is closed by a cover 141 which is held in place by screws 143 which enter tapped holes 145 in the body. The cap has an annular groove 147 which receives an O-ring gasket 149 to seal the joint between the cover and body.

Transverse spaced walls 151 form a chamber 153 adapted to receive either a potting material or a rubber grommet which sealingly engages the wire, and walls, and thus seals off the passage 137 to prevent the entrance of moisture to the motor via the wire conduit.

A lateral boss 155 (Fig. 3) defines a passage 157 which extends substantially at ninety degrees from the passage 137 for the passage of the wires to the exterior of the body. This passage is also provided with a chamber 159 which receives potting material. The passage 157 is tapped at 161 to receive the threaded end of an electric wire conduit 163 (Fig. 1).

It will be seen from Figure 2 that the pump discharge passage 35 communicates with the space 165 between the motor 1 and sleeve 83 which in turn communicates through the passages 167 in the body with the discharge chamber 168 and the outlet opening 169. This opening is surrounded by a flange 171 which has holes 173 formed therein to receive bolts 175 which hold the companion flange 177 in place. A gasket 179 may be provided to seal the joint.

MOTOR PUMP INSTALLATION

Figure 1 discloses a typical installation of the motor-pump unit, in which the inlet companion flange 67 is connected by a nipple 181 to a T 183. One end of the T is connected by a nipple 185, valve 187, nipple 189 and T 191 to a pipe 193 which leads to a storage tank (not shown).

The other outlet from T 183 is connected by nipple 195 and valve 197 and line 199 to an unloading rack for trucks or tank cars etc. (not shown).

T 191 is connected by nipple 199'; L 201, pipe 203, L 205, nipple 207, valve 209 and nipple 211 to the T 213 which is in turn connected by nipple 215 to the outlet companion flange 177.

The T 213 is also connected by nipple 217 and valve 219 to a line 221 which may lead to a truck loading rack or other outlet.

The electric wire conduit 163 is preferably provided with a separable union 223 which is connected by nipple 225 and seal fitting 227 to the conduit line 229 which leads to the motor starting mechanism (not shown) which may be of any conventional type.

Operation

If we assume that liquid is to be unloaded from a tank truck or tank car and discharged into a storage tank, the valves 187 and 219 will be closed while valves 197 and 209 will be open. The source of liquid should be at least one foot above the center line of the pump so that the latter will be primed by gravity. When the motor 1 is energized liquid will flow into line 199, through valve 197, nipple 195, T 183, nipple 181, flange 67, strainer 73, chamber 74 and inlet 43 to the first impeller whence it is discharged to the passages 35, 165 and 167 to the outlet chamber 168 and discharge opening 169 to nipple 215. The liquid then passes through T 213, valve 209 and piping 207, 205, 203, 201, 199', 191 and 193 to the storage tank which is usually an above ground type.

As liquid passes through the pump, the flange 37 and its associated groove 39 restrict the back flow of liquid from chamber 41 to the inlet 43. Similarly, the flange 13 and groove 33 restrict the flow of liquid from 35 to recess or pocket 15. Since liquid is bled from pocket 15 through channels 17, 47 and 45 to the inlet 43, no pressure can build up in this pocket which would produce a thrust on the impeller 25 and thus adversely load the shaft bearings.

The liquid also cools the motor in its passage through the channel 165.

Should it be desired to load a distributor's tank truck directly from the transport or tank car, valves 187 and 209 would be closed and valves 197 and 219 would be opened so that liquid would flow directly to line 221 leading to the loading rack.

In the event no transport or tank car is available for loading the distributor's tank truck, the valves 197 and 209 would be closed while valves 187 and 219 are opened so that liquid would flow from hte storage tank to the loading rack and to the distributor's truck. Again the storage tank should have a head of at least one foot above the centerline of the pump so as to insure gravity priming thereof.

It will be seen that the electric wires may be connected or disconnected by removing screws 143 and cover plate 141 of the junction box and performing the required operation. Since the wire conducting passages are sealed at 227, 153 and 159, no moisture can enter the conduit to the pump or that leading to the controls while the cover 141 is removed or while the union 223 is broken.

To remove the pump from the line it is necessary merely to disconnect the wires at the junction box, break the union 223, remove the flange bolts 175 and 65 whereupon the entire motor-pump unit can be removed from the line for replacement with a spare unit. To install the unit, the process is reversed.

It is obvious that the applications of the motor pump unit are not limited to the piping system disclosed but that it may be used in any line which can be primed so as to start the flow. Further, a self priming type of pump may be provided instead of the type shown.

The pump may be installed in any desired position in which it can be supported by the piping. No base is required to provide separate support.

Further the unit is weather proof and requires no housing or other shelter to protect it.

It will also be seen that the diameter of the pump is only slightly more than twice the diameter of the associated piping so that it does not occupy a great deal of space and can consequently be used in installations in which space is at a premium. It can be mounted in piping under a ceiling or floor, or it can be run between joists or beams thus eliminating the necessity for bringing overhead piping down to floor level in order to make connections with the pump.

Obviously, the unit may be constructed of different materials to enable it to handle various types of liquids and its application is not limited to hydrocarbon products.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

I claim:

1. A motor-pump unit comprising an elongated unitary electric motor having a small diameter relative to its length and comprising first and second end bells, a rotary shaft extending through said first end bell, pump rotor means mounted to be driven by the shaft, a pump body, means for attaching said body to the first end bell of the motor in cooperative relation with said rotor means, said body defining substantially axially directed inlet and outlet passages at its opposite ends respectively, a tubular housing having pipe connecting means defining an inlet at one end, said housing defining a bore and motor receiving means at the other end, said housing being adapted to receive the pump body through the bore, said motor receiving means fitting on the end of the motor, a discharge body having pipe connecting means at one end defining an outlet and having a bore at the other end, means for attaching said discharge body to the second end bell of the motor, a sleeve having its ends disposed in said bores and being supported thereby in radially spaced relation with said motor to form therewith a discharge channel which communicates with said pump body and discharge body outlets, means for holding the discharge body and housing in contact with the ends of the sleeve, to form a unitary structure, said pipe connecting means being in substantially axial alignment so that the unit may be connected directly to coaxial pipe and a pipe line.

2. The structure defined by claim 1 wherein the motor receiving means comprises a plurality of radially inwardly extending ribs which snugly receive and support one end of the motor.

3. The structure defined by claim 1 wherein said pump body includes a central, inlet defining boss which extends axially away from the rotor means, said boss defining the inlet passage and said housing includes a radially inwardly directed flange defining an opening adapted to receive the boss, and sealing means coacting with said flange and boss to prevent the passage of liquid from the discharge to said inlet passage and also to support the pump body.

4. The structure defined by claim 1 wherein the pipe connecting means defining the inlet is provided with a bore defining a radial shoulder, said housing defines an inlet chamber, and wherein a strainer basket provided with a supporting ring extends into said chamber and said ring seats in the bore and is held against movement into said housing by said shoulder.

5. The structure defined in claim 1 wherein the ends of the sleeves are of reduced diameter, said bores in the housing and discharge bodies are counterbored to receive a gasket and a ring which seats on said reduced diameter, said ring supporting said gasket against displacement from said counterbore, said gasket being in sealing contact with said sleeve and counterbore.

6. The structure defined in claim 1 wherein said motor and pump body define a channel connecting the space between the rotor means and the motor with the inlet passage to prevent the accumulation of liquid under pressure therein.

7. The structure defined by claim 1 wherein the other end of the motor includes a number of radial fins, said discharge body includes matching spokes and fastener means connect said spokes to the fins to hold the body on the motor.

8. The structure defined by claim 1 wherein the other end of said motor terminates in an axially extending boss for the passage of the motor leads, said discharge body includes a first wire conduit terminating at one end in an axial bore adapted to receive said boss, sealing means disposed between the conduit and motor, the other end of said conduit extending substantially radially through the body and terminating in a junction box which defines an exterior opening, a second wire conduit leading from said junction box to an exterior opening and means including a cover removably mounted on said body for sealingly closing said junction box.

9. The structure defined by claim 1 wherein the other end of said motor terminates in an axially extending boss for the passage of the motor leads, said discharge body includes a first wire conduit terminating at one end in an axial bore adapted to receive said boss, sealing means disposed between the conduit and motor, the other end of said conduit extending substantially radially through the body and terminating in a junction box which defines an exterior opening, a second wire conduit leading from said junction box to an exterior opening and means including a cover removably mounted on said body for sealingly closing said junction box, said second conduit terminating in a tapped opening, and a third conduit mounted in said opening and terminating in a separable coupling.

10. The structure defined by claim 1 wherein the other end of said motor terminates in an axially extending boss for the passage of the motor leads, said discharge body includes a first wire conduit terminating at one end in an axial bore adapted to receive said boss, sealing means disposed between the conduit and motor, the other end of said conduit extending substantially radially through the body and terminating in a junction box which defines an exterior opening, a second wire conduit leading from said junction box said first conduit including means forming a chamber for the reception of potting material adjacent the junction box and said second conduit including means forming a chamber for the reception of potting material adjacent the junction box.

11. The structure defined by claim 1 wherein the pump body includes diffuser ring means and a pump cover and said rotor means includes centrifugal type impellers.

12. The structure defined in claim 1 wherein said housing and discharge body each include a radially outwardly extending flange defining a series of holes, and said means for holding said housing and body against in contact with the ends of the sleeve includes a number of tie rods mounted at one end in the holes of one flange and having their other ends extending through the holes of the other flange, and nuts on said other ends.

13. In a pumping system, the combination of a motor pump unit comprising, an elongated relatively small diameter motor having a pump mounted thereon at one end thereof, said pump having suction and discharge conduits, said pump including impeller means connected to be driven by the motor, a casing surrounding said motor, mounted in radially spaced relation therewith and having communication with the pump discharge conduit to provide an annular passage for liquid discharged by said pump, said unit including an inlet defining pipe connecting means communicating with the suction conduit of said pump and a discharge body having pipe connecting means defining a discharge passage, said passage being in communication with said annular passage, said pipe connecting means being mounted substantially coaxially with each other to receive the coaxial pipes of a pipe line, said motor including electric leads and an outlet therefore, said discharge body including means defining a junction box, said body defining a first conduit having one end opening into said junction box and means at the other end for sealingly engaging the motor lead outlet, said body defining a second wire conduit for power supply lines, having one end opening into said junction box and the other end terminating in a threaded opening for the reception of a third conduit, said body defining an external opening for the junction box and means including a removable cover for sealingly closing said junction box to provide a vapor proof conduit system for said leads and power supply wires.

14. In a pumping system, the combination of a motor pump unit comprising, an elongated relatively small diameter motor having a pump mounted thereon at one end thereof, said pump having suction and discharge conduits, said pump including impeller means connected to be driven by the motor, a casing surrounding said motor, mounted in radially spaced relation therewith and having communication with the pump discharge conduit to provide an annular passage for liquid discharged by said pump, said unit including an inlet defining pipe connecting means communicating with the suction conduit of said pump and a discharge body having pipe connecting means defining a discharge passage, said passage being in communication with said annular passage, said pipe connecting means being mounted substantially coaxially with each other to receive the coaxial pipes of a pipe line, said motor including electric leads and an outlet therefore, said discharge body including means defining a junction box, said body defining a first conduit having one end opening into said junction box and means at the other end for sealingly engaging the motor lead outlet, said body defining a second wire conduit for power supply lines, having one end opening into said junction box and the other end terminating in a threaded opening for the reception of a third conduit, said body defining an external opening for the junction box and means including a removable cover for sealingly closing said junction box to provide a vapor proof conduit system for said leads and power supply wires, said third conduit including a separable coupling which with said pipe connecting means enables the unit to be readily connected to and disconnected from both the pipe line and the power supply lines.

References Cited in the file of this patent

UNITED STATES PATENTS

| | | |
|---|---|---|
| 2,034,790 | Arutunoff | Mar. 24, 1936 |
| 2,612,843 | Gruetjen | Oct. 7, 1952 |
| 2,639,671 | Wagner | May 26, 1953 |
| 2,689,529 | Wightman | Sept. 21, 1954 |